United States Patent [19]

Sequi et al.

[11] Patent Number: 6,080,220
[45] Date of Patent: Jun. 27, 2000

[54] STABLE FORM OF IRON HUMATE OR OF OTHER MESO AND MICRO NUTRITIVE ELEMENTS AVAILABLE FOR PLANT NUTRITION AND METHOD FOR OBTAINING IT

[75] Inventors: Paolo Sequi, Rome; Marco Govi, Modena; Claudio Ciavatta, Rimini, all of Italy

[73] Assignee: Valagro S.p.A., Piazzano Di Atessa, Italy

[21] Appl. No.: 09/016,227

[22] Filed: Jan. 30, 1998

[30] Foreign Application Priority Data

Feb. 3, 1997 [IT] Italy .................................. RM97A0053

[51] Int. Cl.⁷ .................................................... C09F 15/00
[52] U.S. Cl. ...................................................................... 71/11
[58] Field of Search .................................. 71/11, 23, 24, 71/33, 48, DIG. 2; 556/17

[56] References Cited

U.S. PATENT DOCUMENTS 4,440,560 4/1984 Nakamura et al. .......................... 71/24
5,354,350 10/1994 Moore ......................................... 71/24

FOREIGN PATENT DOCUMENTS 0282250 9/1988 European Pat. Off. .
2234245 1/1975 France .
1247351 8/1967 Germany .

*Primary Examiner*—Steven P. Griffin
*Assistant Examiner*—Maribel Medina
*Attorney, Agent, or Firm*—Browdy and Neimark

[57] ABSTRACT

Described herein is a complex between humic substances and iron denominated "iron humate" characterized in that it has a structure of the type:

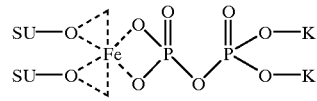

where the metal is protected from the pyrophosphate and from the humic substances (SU), obtained through a method comprising the following phases:

a) dosage of the humic extracts
b) purification of said humic extracts through centrifuging or filter pressing to eliminate any suspended particles
c) transfer of the floating product into a mixer
d) preparation of a solution of $K_4P_2O_7 10H_2O$
e) mixing solution d) with an aqueous solution of $FeSO_4 7H_2O$ containing a minimum quantity of $H_2SO_4$ operating slowly and keeping the humic extract under vigorous agitation
f) after agitation for a few minutes, rapid drying at 60–90° C.

9 Claims, No Drawings

STABLE FORM OF IRON HUMATE OR OF OTHER MESO AND MICRO NUTRITIVE ELEMENTS AVAILABLE FOR PLANT NUTRITION AND METHOD FOR OBTAINING IT

FIELD OF THE INVENTION

It is known that the meso and micro elements essential for plant nutrition are fundamentally calcium, magnesium, sulfur, iron, manganese, copper, zinc, boron and molybdenum. Under agricultural conditions, situations of nutritional deficiency may arise mainly due to an insufficient availability of iron, calcium and magnesium and at times also of the other elements.

In reality, the soil often contains abundant quantities of these elements, but most of them may be present in insoluble forms, such as oxides (for instance $Fe_2O_3$), hydroxides (for instance $Fe(OH)_3$) and carbonates (for instance $CaCO_3$ and $MgCO_3$), not available for vegetable nutrition since they are found in an insoluble crystalline or amorphous form.

There are only few vegetable species which, in case of need dictated by the absence of more easily available forms, are able to set in motion an effective, but costly biochemical process that allows to bring back to a soluble form precipitated elements in the form of oxides, hydroxides or carbonates. The mechanisms illustrated in the example can apply, in addition to iron, calcium and magnesium, also for manganese, copper and zinc. All these nutritive elements shall therefore have to be present in the soil in a form available for their assimilation, in order to be used by plants.

Different physical phases are present in the soil: a gaseous phase, a liquid phase and a solid phase; the last one comprises a mineral part and organic materials.

Organic materials in turn comprise humic substances and non humified substances, and they derive from the contribution and from the transformation of animal and vegetable organic residues. Humic substances are of a complex polymeric nature and they possess numerous functional groups, prevalently carboxylic and phenolic; they are very stable over time, difficult for micro-organisms to attack and able to perform a series of agronomic functions maintaining a certain level of fertility in the soil.

The nutritional functions of humic substances are:

1) direct, when the nutritive elements are released in the course of the slow mineralization of the humic substances themselves;
2) indirect, when for instance their ability to complex and chelate the metals that are found in the liquid phase, then to cede them to the plants, is used.

In nature said indirect nutritional function is considered the more important one to make available different metallic nutritive elements, such as iron, calcium and magnesium. Humic substances tend to chelate the metals present in the soil solution, thus preventing their precipitation in the form of oxides, hydroxides or carbonates, unusable because they are in insoluble forms, inaccessible to the roots of the plants. Said chelation, instead, makes the metals available for nutritional processes.

Fertilization can essentially be performed in two ways: through the leaves or through the soil. In foliar fertilization the fertilizer is absorbed through the tissues that coat the outer part of the leaves, so it can only take place with fertilizers whose molecular structure has very small dimensions and this vehicle is used mostly to solve momentary problems of nutritional deficiency. Different is the case of fertilization through the soil, which is the means that ensures plant nutrition in nature.

BACKGROUND OF THE INVENTION

The field of the present invention covers the fertilization that takes place through the soil, the latter being meant as the natural means to make the fertilizer available to the root apparatus. Thus it entails preventing the fertilizer, constituted by a common salt, for instance ferrous sulfate ($FeSO_4$) placed in a soil lacking iron, with a neutral-alkaline pH (e.g. pH 7–8) and poor in humic substances, from transforming itself into insoluble products such as oxide, hydroxide and carbonate.

From an ideal point of view, a fertilizer based on meso and micro elements to be used for soil fertilization should have the following characteristics:

1) have the metal bonded in a form that can be assimilated, i.e. transformed, where it is not originally, into a soluble form and hence available for root nutrition;
2) have a sufficient bond force not to lose the metal in the soil, but not excessive to allow the chelating agents of the roots to detach it and make it available for the biochemical processes employed for absorption by the vegetables;
3) not be easily degradable in the soil to be able to maintain the metal in chelated form for a long enough time, corresponding at least to the entire cultivation cycle.

Currently there are three main categories of fertilizers based on meso and micro elements:

a) Inorganic salts, which lack the ability to make the fertilizing element available for the roots for a sufficiently long period;
b) Organic complexes, which are essentially organic salts with functional groups (e.g. citric acid) able to bond a metal even strongly.

Said complexes very often do not allow a good utilization of the metal both due to biodegradability through micro-organism attack, and due to the excessively intense bond force, which does not allow the metal to be freed and inserted in the biological cycles;

c) Organic chelates which are characterised by complexing the metal with multiple co-ordination bonds on the part of polyvalent molecules which in this way envelop it protecting it with a configuration which can be depicted as a pincer, or chela. The structure of these compounds is thus such as to offer a sufficient protection to the metal, maintaining it in available form for a sufficiently long time. This means that in theory a contribution of fertilizer through an organic chelate is able to meet the requirement of a cultivation for a sufficiently long time. These types of chelates, however, do not escape from microbic activity and thus undergo a rather rapid degradation, such as not to allow the availability of the metal in the soil through the entire cultivation season. It is therefore possible that in that case the cultivated plants live for a period of the year in a phase of nutritional deficiency, particularly if they are pluriennial species (for instance fruit bearing plants).

The possibility is known of using as organic salts some derivatives of the tartronic acids and their salts in the variants with and without phosphate mobilization, as Italian patents no. 767605, no. 788509 and no 833128 teach. Other chelates and organic salts are described in U.S. Pat. Nos.

4.181.516 (Gray, 1980) and U.S. Pat. No. 4.786.387 (Marihart, 1988) and in European patent 284339 B1 (Marihart, 1991). In these last two patents fulvic acid (a fraction of the humic substances) is used together with various chelates and anhydrous ammonia (in order to neutralize the mixture) without obtaining the formation of protective bridge structures of the type that is the subject of the present invention.

A work published by D. F. Clemens and colleagues in Fertilizer Research Vol 25, pp. 127–131 (1990) describes the structure of chelating agents and of the related metal complexes, such as those of Fe(III), distinguishing it in two classes: aminopolycarboxylates and hydroxycarboxylates (where the term carboxylate means "functional group of an organic acid"). For instance to the aminopolycarboxylate class belong EDTA (ethylendiamintetracetic acid), and also EDDHA (ethylendiamine di(o-hydroxyphenylacetic) acid); to the hydroxycarboxylic class belong, for instance citric acid, gluconic acid, glucoheptonic acid.

The structure of the humic substances corresponds to the characteristics required by an ideal chelating-complexing agent. For the purposes of vegetable nutrition, humic substances are in any case the ideal complexing agents for iron and for the other nutritive elements, as is known from the technical literature, for example according to F. J. Stevenson "Humus Chemistry" J. Wiley & Sons Ed. (1982), according to P. Sequi "La sostanza organica nel terreno. Funzioni nutrizionali" L'Italia agricola 113(2):91–112 (1976).

The structure of the humic substances is not well defined in the part the involves the chelation of metals. It is however known that the humic molecule uses mainly the OHs of the functional groups to be able to complex the metal elements (Stevenson, 1982). According to some authors the structure of the metal-humate complex involves two oxyhydrils, one of them carboxylic and one deriving from another functional group, alcoholic, phenolic or other. As reported by Sequi (1976), the structure of the complex also comprises a phosphate group that in this case has two functions:

1) to protect the metal (for instance, iron) from being completely "enclosed" by the humic substances, thereby becoming less easily available for plants and
2) to be available in turn as such for vegetable nutrition.

In this respect it should not be forgotten that phosphate also presents great problems of availability in the soil since it is easily prone to undergo precipitation processes.

According to Stevenson (1982), the extraction of the humic substances using a base such as NaOH or KOH takes place through the salification of the humic and fulvic acids in an alkaline environment according to the following reaction:

HA—OH+K—OH→HA—OK+H$_2$O where HA—OH is the humic acid. The K$^+$ can also be replaced with Na$^+$; the compound that is formed (HA—OK or HA—ONa) is a salt of the humic acid (humate).

In the case wherein to the humic molecule is bonded a non alkaline metal (e.g. iron), the base alone is not able to salify the humic acid and the extraction of the humic acid complexed with the metal has to take place with the aid of a salt that possesses a chelating agent, such as sodium or potassium pyrophosphate. According to what is reported by Stevenson (1982) the reaction that would take the humic acid into solution could be as follows:

HA—O—Me—+1/4K$_4$P$_2$O$_4$→HA—O—K+1/4Me$_4$P$_2$O$_7$↓

In other words the metal would be detached from the humic acid and replaced with the K$^+$, thereby originating a salt of the humic acid, whilst the metal would be complexed by the pyrophosphate originating an insoluble salt which would precipitate (↓).

The aforesaid reaction is likely to take place only if the complexing agent of the iron has a bonding force weaker than that of the pyrophosphate, but it cannot take place when the organic complexing agent (humic substance in the specific case) has a bonding force stronger than that of the inorganic complexing agent (pyrophosphate).

In a process of extraction of the humic substances, i.e. of solubilisation, the combined action of the two extracting agents KOH and K$_4$P$_2$O$_7$ allows to realize the following phases (Stevenson, 1982; E. Bar-Ness and Y. Chen Plant Soil, 130, 35–43, 1991):

1) solubilisation by the KOH, in the form of potassic salts, of the humic substances not complexed to metals;
2) solubilisation by the K$_4$P$_2$O$_7$ in the form of potassic salts, of the humic substances bonded to metals with low chelating force with simultaneous precipitation of the metal-pyrophosphate complexes;
3) solubilisation by the K$_4$P$_2$O$_7$ of the humic substances bonded to metals with high chelating force with the formation of a complex between the humic substance and the pyrophosphate by means of a metal bridge. This phase is confirmed by Stevenson (1982) when he described the extraction (solubilisation) criteria of copper from the soil: the form bonded to the organic substance is extracted with pyrophosphate. The same reaction is described in the work by Bar-Ness and Chen (1991), when they discuss a remarkable presence of iron in the organic substance extracted from a peat previously complexed with iron.

In the occasions mentioned above and in other cases wherein the attempt was made to prepare metal chelates based on humic substances for research or commercial purposes, in order to have available a product with higher quality and performance than those of the products present on the market, the following problems were noted:

in many cases, mainly because of erroneous stoichiometric computations, the addition of the metal to the humic extract (saline aqueous solution containing the humic substances in solubilised form) led to an immediate flocculation of the extract;

the chelates based on humic substances prepared until now were in the liquid state, in the form of a solution, but the solubility of the product was very low due to the polymerization phenomena that took place in a few days: only the complexes of the metals with the fulvic acids (U.S. Pat. No. 4,786,387 and European patent 284.339) could be soluble for the presence of other chelating substances as has been stated above;

the quantity of metal bonded to the humic substances was always very low and not sufficient to justify the launch on the market of a commercial formulation (Lobartini and Orioli, Plant Soil, 106, 153, 1988);

the products were not found to be soluble after drying; this highlighted the fact that the presence of the metal had favored the formation of a closed polymer and hence of a flocculate.

DESCRIPTION OF THE DISCLOSURE

Said problems and others presented by the known techniques and products are solved by the present invention which describes a stable composition of iron humate or other meso and micro nutritive elements available for vegetable nutrition and the method for obtaining it.

In the case of the present invention the humic substances that are used as raw materials are already in extracted form (for example humic extracts obtained by extraction with KOH of the humic substances from leonardite) and therefore one is faced with potassic salts of organic acids. This is obviously a very complex mixture wherein are present both compounds with low and with high chelating force.

The productive method constituting the subject of the presence invention comprises the following steps:

a) To the humic extract obtained through the solubilisation of humic substances with an aqueous solution of KOH or other alkaline reactant, after the accurate elimination by centrifuging or filter pressing of the parts which may be in suspension, is added a quantity, to be defined according to the characteristics of the humic extract, of a molecule of the pyrophosphate type ($K_4P_2O_7$). In this phase all that is done is to mix the components without provoking any specific reaction.

b) To the solution obtained in phase a), slowly in order to make possible the chelation/complexing reaction, but immediately, is added a solution of $FeSO_4$ or other inorganic salt completely soluble in water. If the salt is said ferrous sulfate, at this point the iron, the humic substance and the $K_4P_2O_7$ react to each other according to the mechanism described below: the humic substance contained in the extract can have very different complexing forces, but for the purposes of the reaction mechanism with the Fe(II) and with the $K_4P_2O_7$ we are interested in subdividing them in to categories: 1) humic substances with chelating force greater than that of $K_4P_2O_7$ and 2) humic substances with chelating force smaller than $K_4P_2O_7$. In the moment wherein an Fe(II) ion is added to the solution containing the humic substances in potassic form and the $K_4P_2O_7$, the metal is complexed by the humic molecule with the greatest chelating force and simultaneously it forms a bridge with a phosphate of the $K_4P_2O_7$ forming a phospho-metal-humate complex. The evidence of this reaction is given by the fact that, if the metal bonded only to the $K_4P_2O_7$ a light colored precipitate would be formed, whereas if a reaction took place only between the humic substance and the iron, there would be flocculation of the humic substance with the subsequent formation of a dark precipitate. Said reaction takes place until all the humic substances with chelating force greater than that of the $K_4P_2O_7$ have reacted with the iron and thus also with the $K_4P_2O_7$. At this point, if Fe(II) is continued to be added, it has been observed that the metal is complexed by the $K_4P_2O_7$ because the latter is now the free complexing agent with the greatest bonding force. As further evidence of this one can observe the immediate formation of a whitish flocculate.

In the method constituting the subject of the present invention, salts of organic compounds are not to be used, since one would not be certain of said chelating/complexing reactions on the part of the humic substances, but one would risk obtaining a mixture of humic substances and of the metal complex, which presents the problems described above.

With the method of the present invention a soluble complex is formed between the humic substances, the metal and the pyrophosphate, stable enough to be dehydrated (dehydration must take place immediately after the preparation phase). The dehydrated product can be completely redissolved in water and can thus be used for soil fertilization with the practice of ferti-irrigation. The final product has a total iron content, completely bonded to the humic substances, equal to or greater than 3–4% depending on the organic matrix used for the extraction of the humic substances. Using optimal humic extracts, it is possible to obtain an iron humate containing about 4.5% of chelated iron. Said titer can turn out to be lower if one uses organic extracts from peats, compost or other organic matrices less humified than leonardite. With some humic extracts from coal dusts a titer was obtained equal to 7% in bonded iron.

If metals having different atomic weight and valence from iron are used, it is obvious that the titers in metal complexed with the humic substances will be different. The main reason why in most cases reference is made to iron is that this nutritive element is, without a doubt, the most critical one in meso and microelement nutritional deficiencies.

The quantities of reactants must be perfectly calibrated in order to avoid adding an excess of metal and thereby causing the precipitation of Fe-pyrophosphate and/or humic substances polymerized around iron.

The iron humates prepared until now were characterised, at a neutral to alkaline pH value, by a structure similar to the following one:

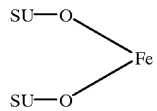

In this situation the metal ion, in spite of the alkalinity of the medium, causes the rapid polymerization of the humic substances forming a complex of the type:

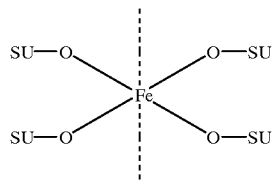

Polymerization could be prevented only by drastically reducing the bivalent metal (Fe) content, in order to entrust potassium, as the counter ion, with the task of keeping the complex in solution. In other words the potassium ion must neutralize most of the charges of the functional groups of the humic substances preventing polymerization by the iron.

On the basis of what has been stated and of available information it is deemed that the iron humate is, from a chemical point of view, thus formed:

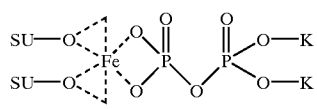

With such a structure the metal is protected from the pyrophosphate and from the humic substances and the rapid flocculation of the complex due to the creation of possible coordination bonds is prevented.

To obtain the products constituting the subject of the present invention the following methods are reported below, purely by way of non limiting examples:

EXAMPLE I

The following phases were realized:
a) the humic extracts were dosed to correspond to 3 kg of dehydrated humic extracts;

b) said humic extracts were purified of suspended particles (clay substances and colloidal organic material in suspension), through centrifuging;
c) the floating product was transferred into a mixer;
d) a quantity of 1.5 kg of $K_4P_2O_7 \cdot 10H_2O$ was added into the mixer and dissolved completely;
e) separately, an aqueous solution is prepared of 1 kg of $FeSO_4 \cdot 7H_2O$ in 10–15 liters of water, with the addition of a minimum quantity of $H_2O_4$ to prevent the oxidation of the Fe(H) to Fe(III);
f) to the completed solution d) was slowly added solution e), simultaneously and rapidly agitating the humic extract;
g) agitation was protracted for 5 minutes and then drying was rapidly performed.

Overall, 4.5 kg of finished products were obtained with a bonded iron titer equal to 4.4%.

The product obtained was subjected on an iron-poor soil, in a controlled environment, to agronomic tests in comparison with other classic chelates (EDDHA-Fe) and the following results were obtained: all horticultural plants tested (cucumbers, strawberries, etc.) yielded sharply better productive results from the quantitative and qualitative point of view when they were fertilized with iron humate, whereas the other classic chelates yielded positive results that were temporary and discontinuous.

The above results demonstrate the greater fertilizing efficiency of the present invention, compared with products normally used today for plant nutrition.

Numerous variations exist to Example I reported above since the humic extracts can come from different sources and thus can be obtained with a variety of solvents, at different pressures and temperatures, and come from all the organic matrices containing humic substances or the like (e.g. peats, lignites, leonardites, coals, organic manures, compost, sludges, sewage, soil, etc.).

In addition to iron salts, the method can also be applied to the salts of other metals essential for plant nutrition such as calcium, magnesium, zinc, etc.

In addition to decahydrate tetrapotassic pyrophosphate, other types of pyrophosphates and metaphosphates can be used, as well as pyrophosphoric and metaphosphoric acid and all organic and inorganic compounds containing phosphorus, provided the reaction is regulated with buffering systems.

EXAMPLE II

A fruit orchard comprising twenty rows of pear trees suffering from iron and zinc deficiency was fertilized, in groups of four rows, in the first row with a product identical to the one described in Example I, in the second row with a product that was wholly similar, except for the preparation conducted with zinc sulfate instead of iron sulfate, in the third row with a mixture of the two previous ones, whilst in the fourth row fertilization was omitted. Each subsequent group of four rows was fertilized for confirmation according to the same procedures.

Production sharply improved in the first and second row of each group, but only in the third one did it become abundant and qualitatively perfect. The trees of the fourth row deteriorated and their production appeared extremely poor. During the five years following that of fertilization the trees of the third row continued to show full vegetative and productive vigor, whilst those of the first and of the second row progressively decreased their production and some of the trees of the fourth row even died, with subsequent failures along the row.

EXAMPLE III

Trees in some rows of an orange orchard planted on highly calcareous and iron-poor soil were alternatively fertilized or not with a product identical to that of Example 1, except for the preparation, which had been conducted with sodium metaphosphate instead of potassium pyrophosphate. The tests yielded excellent qualitative and quantitative results only in the fertilized trees. The positive results were confirmed for four years after fertilization.

The invention thus conceived can be subject to numerous modifications and variations, without thereby departing from the scope of the inventive concept.

In practice, modifications and/or improvements are possible without thereby departing from the scope of the claims that follows.

What is claimed:

1. A humic complex having a structure:

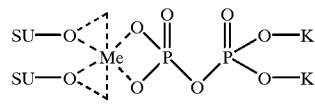

wherein Me is a metal selected from the group consisting of iron, calcium, magnesium, manganese, copper, zinc, and cobalt, and said metal is protected from the pyrophosphate and from the humic substances (SU), obtained through a method comprising the following phases:
a) dosage of the humic extracts;
b) purification of said humic extracts through centrifuging or filter pressing to eliminate any suspended particles;
c) transfer of the floating product into a mixer;
d) preparation of a solution of $K_4P_2O_7 \cdot 10H_2O$;
e) mixing solution d) with an aqueous solution of $MeSO_4 \cdot 7H_2O$ containing $H_2SO_4$ and keeping the humic extract under vigorous agitation;
f) after agitation for a few minutes, rapid drying.

2. The humic complex of claim 1, wherein Me is Fe.

3. The humic complex according to claim 2, containing artificial humic substances, or fractions of natural or artificial humic substances, soluble or insoluble.

4. The humic complex according to claim 2, wherein, in the course of the preparation, molecules are employed other than pyrophosphate, but able to form bridges with the iron which in turn are bonded to the humic substances.

5. The humic complex according to claim 4, containing artificial humic substances, or fractions of natural or artificial humic substances, soluble or insoluble.

6. The humic complex according to claim 1, containing artificial humic substances, or fractions of natural or artificial humic substances, soluble or insoluble.

7. The humic complex according to claim 1, wherein, in the course of the preparation, molecules are employed other than pyrophosphate, but able to form bridges with the iron or with said metals other than iron which in turn are bonded to the humic substances.

8. The humic complex according to claim 7, containing artificial humic substances, or fractions of natural or artificial humic substances, soluble or insoluble.

9. The humic complex of claim 1, wherein Me is calcium, magnesium, manganese, copper, zinc or cobalt.

* * * * *